Aug. 11, 1931.    F. S. DENISON    1,818,697
THERMOSTATIC SWITCH
Original Filed June 26, 1924
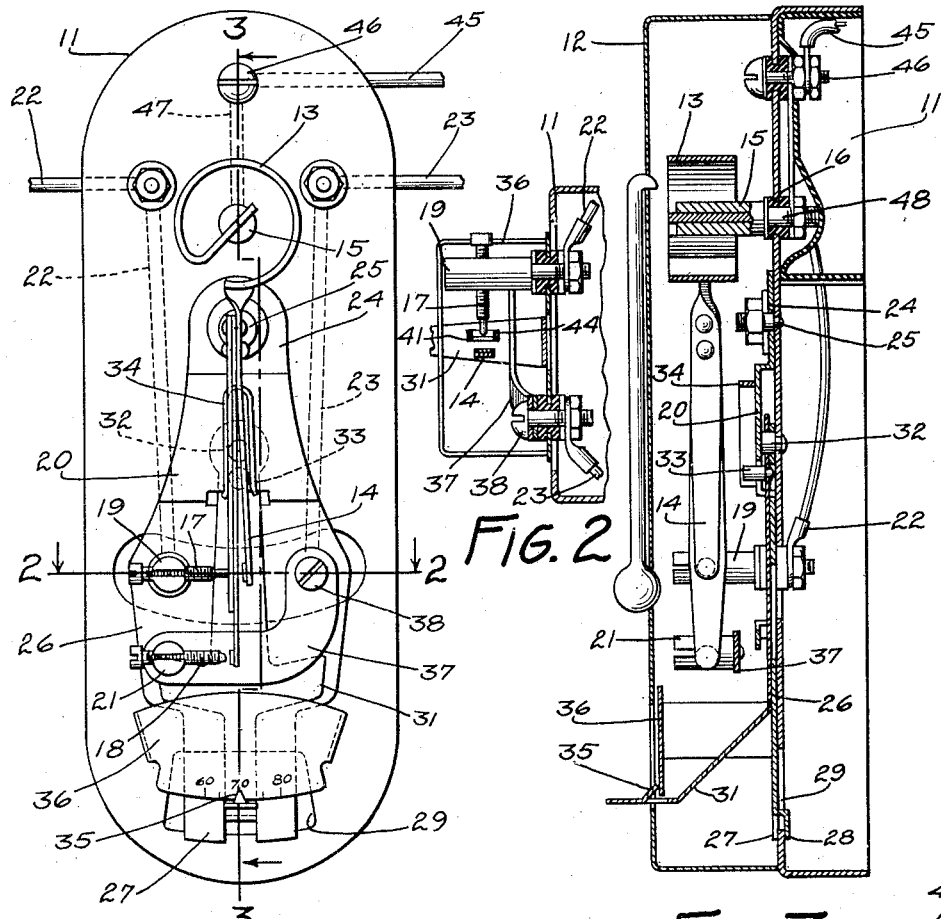
INVENTOR
FREDERICK S. DENISON
By *Paul, Paul & Moore*
ATTORNEYS Patented Aug. 11, 1931

1,818,697

UNITED STATES PATENT OFFICE

FREDERICK S. DENISON, OF MINNEAPOLIS, MINNESOTA, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

THERMOSTATIC SWITCH

Original application filed June 26, 1924, Serial No. 722,586. Divided and this application filed May 14, 1927. Serial No. 191,431.

This invention relates to improvements in automatic circuit-controlling apparatus of the general type now in common use to regulate or control electric circuits which in turn operate devices to change the position of dampers, valves or oil-burner motors, or controls of heating plants or of refrigerating plants, etc.

This application is a division of my co-pending application for automatic circuit controlling apparatus filed June 26th, 1924, Serial Number 722,586.

It is common in such apparatus to employ a pair of opposed contacts with which a thermostatic element or an element whose position varies by changes in pressure of air, steam, water, etc., may close or open two different circuits in accordance with changes affecting the position of the element such as a thermo-bar or a Bourdon spring or tube. The use of such a double-circuit apparatus has been found open to objections. In such use, one circuit is employed to start the mechanism and the other circuit is used to stop it. With such apparatus, the stopping circuit may become interrupted, whether from fouled contacts, broken or loose connections, a ground, or rodents gnawing the wires, etc., in any such contingencies, the automatic device can not stop the mechanism which results in dangerous conditions. It is therefore preferable to use a single circuit to start the mechanism, the latter being so arranged as to automatically stop when the control circuit is broken. Where a single contact is closed to operate a switch mechanism, the slightest change in temperature or pressure, etc., will make or break the circuit, causing at the critical points a practically continuous on and off action of the device or, where the element is subject to vibrations, etc., substantially the same result will follow.

One of the objects of this invention is to provide a novel apparatus primarily designed to effectually avoid all such disadvantages. The principal object of the present invention is to provide means for closing a single circuit across two contacts and for holding such circuit in closed position until the automatically operable element has moved a predetermined distance from one of the contacts whereupon the circuit is opened thus to afford the desired lag-action in the opening movement of the element. Further, means are herein provided for the successive or sequential making and breaking of a circuit across contacts by an automatic element. This invention also includes the combination of a switch for the main circuit to be controlled, which switch is yieldably mantained in its normal open position so as to render inoperative the controlled mechanism such, for example, as a motor used for the actuation of an oil burner. An electrically operable device is employed to maintain this switch in closed position when the device-circuit is energized while the energization of the device-circuit is controlled by the novel automatically operable mechanism.

Another object of the invention is to provide an improved automatic apparatus for the control of circuits.

Yet another object of the invention resides in the novel construction of the thermostatic makes and breaks for controlling the single control circuit.

A further object resides in providing a novel construction of switch or control mechanism for automatically operating the controlled element when the control circuit is broken.

Other objects of the invention will more fully appear from the following description and the accompanying drawings and will be pointed out in the annexed claims.

In the accompanying drawings there has been disclosed a structure designed to carry out the objects of the invention. This structure is shown as including an automatic element of the thermostatic type but it is to be understood that the invention is not confined to the exact features shown as various changes may be made within the scope of the claims which follow.

In the drawings:

Figure 1 is a plan view of the novel thermostatic mechanism in open circuit position and with the cover removed;

Figure 2 is a cross-sectional view of a portion of the mechanism on the line 2—2 of Figure 1 and additionally showing the cover;

Figure 3 is a longitudinal sectional view through the mechanism on the line 3—3 of Figure 1;

Figure 4 is an enlarged view of the contacts and showing, in longitudinal section, the contact-making members of the thermo-bar in open position;

Figure 5 is a view similar to that of Figure 4 but showing the flexible member in engagement with the lower contact; while Figure 6 is a similar view to the preceding but showing both members in contacting position.

The thermostatic mechanism now described is here shown as of a general form of construction now in use, and comprises a metallic base 11 and a suitable cover 12 adapted to enclose the working parts. The thermostatic element or thermo-bar comprises a substantially ring-like bar 13 which has securely attached thereto—as by welding—a relatively stiff metallic member such as the blade 14 formed of a bar of suitable metal which is an electric conductor. As the mechanism is preferably mounted in an upright position, the blade 14 depends from the thermo-bar 13. The ring-like bar 13 is carried by a post 15 mounted upon the base and insulated therefrom by the insulation 16.

Two contacts or terminals are supported by the base and are here shown as the terminally pointed screws 17 and 18 received in adjustable threaded engagement in their respective posts 19 and 21. The post 19 and therefore the contact screw 17, are electrically connected to the wire 22 while the post 21 and its screw 18 are similarly connected to the wire 23.

The positions of these posts and contact screws may be adjustably and selectively varied with relation to the thermo-bar. To that end, an elongated plate 24 is mounted at its upper end upon the pivot pin 25 carried by the base. Downwardly extending from its pivotal axis, the plate is formed with an outwardly offset portion 20, then a transversely enlarged section 26 and finally a terminal foot 27 having a toe 28 bent to extend through an aperture 29 extending partly across the base and to engage frictionally the under surface of the base adjacent the aperture 29. The selected means for shifting the plate is a lever 31 pivoted upon the pin 32 outwardly projecting from the base beneath the offset portion 20 which portion is apertured to receive the stud 33 of the lever 31. This stud 33 is embraced by an elongated U-shaped wall 34 secured to the outer face of the offset portion 20 of the plate so that movement of the lever 31 is communicated to the pivoted plate in a lessened degree. The lower end of the lever 31 terminates in an indicator 35 which cooperates with temperature indicia upon the outer surface of a bridge 36, projecting from the lower portion of the base 11.

The posts 19 and 21 are carried by the enlarged section 26 of this movable plate so that they may be adjustably moved in an arc of which the center is at the axis of the pivot pin 25 of the plate. Thus the posts may be selectively adjusted to vary the effective opening and closing travel of the thermostatic elements and its contacts. As it is preferred to mount this mechanism in an upright position, the parts may, for convenience of reference, be described with such mounting in mind. The upper post 19 is directly borne by the section 26 from which it is insulated and this post rearwardly extends through an arcuate opening in the base so that its wire 22 may conveniently be connected to the post. The lower post 21 is carried in insulated position upon the elbow arm 37 depending from the section 26 and secured thereto by the screw 38 which is insulated from the section 26 and extends through the arcuate aperture in the base for connection with its wire 23. The posts 19 and 21 are thus mounted substantially in vertical alinement and are insulated from each other and may, upon shifting of the lever 31, be adjustably positioned with relation to the blade 14 and its associated parts, whose positions are controlled by the thermo-bar 13.

A single control circuit is preferably used and it may be closed across the contact screws 17 and 18 and, in this preferred form of the invention, the circuit-closing means consists of a pair of members which are adapted to be successively engaged with their respective screws. It may also be noted that the desirable lag-action is attained by maintaining the circuit, when closed, in such closed position until after all of the contact connections have been broken.

In the form here shown, the relatively stiff blade 14 is carried by the thermo-bar 13 and is adapted to engage the contact screw 17 in order to form an electrical connection therewith. A second blade 41 is also carried by the thermo-bar 13 by means of its riveting to the blade 14. The blades 14 and 41 are so arranged that they terminally diverge and each bears a contact tip 42. The contact tip of the flexible blade is adapted to engage the end of the lower contact screw 18. This flexible blade 41 is also provided with an aperture 43 so that the other contact screw 17 may freely be passed therethrough, the resultant air gap providing sufficient insulation between the contact screw 17 and the flexible blade 41. This flexible blade is also desirably provided with a reinforcing or backing plate 44. The upper ends of the backing plate, the flexible blade 41 and the relatively stiff blade 14 are riveted together to present a substantially unitary structure in electrical connection at that ends. The plate 44 and blade 14 are both of relatively stiff metal and are disposed in terminally diverging relation, the flexible blade being interposed so that its flexibility permits movement of its major portion between the backing plate and blade 14. It may be noted that the backing plate 44, as clearly shown in Figure 4, is also provided with an aperture 43 in order that it may remain out of contact with the screw contact 17 upon movement of the plate 44.

In addition to the circuit wires 22 and 25, which respectively are connected to the contact screws 17 and 18, a supplemental wire 45 is electrically connected to the binding post 46 mounted in insulated position upon the base 11, which post 46 is, in turn, connected by the conductor 47 to the reduced portion 48 of the post 15 of the thermo-bar 13. This reduced portion 48 is surrounded by the insulation 16 carried by the base 11. The wire 45 is thus electrically connected to the metallic thermo-bar 13 and hence also to the blades 14 and 41.

As the thermo-bar 13 cools, the blades 14 and 41 and the backing plate 44 move toward the contact screws 17 and 18. Owing to the divergent relation of these two blades, the relatively flexible blade 41 first engages the lower contact screw 18 as is illustrated in Figure 5. In such position, the upper screw is freely passed through the alined apertures in the plate 44 and flexible blade 41 and is out of electrical connection therewith while the other blade 14 is spaced from its screw 17. The electro-magnet circuit thus remains open, being broken at the posts. Further movement of the thermo-bar responsively to its cooling condition, causes engagement of the stiff blade 14 with its contact screw 17 freely projecting through the apertured blade 41. The backing plate maintains its spaced relation from the blade 14 while the blade 41 flexibly remains in contact with its screw 18 as shown in Figure 6. Thus, the contacts are successively made.

In some of the former thermostatic switches or mechanisms it was found that, when the thermo-bar was at a certain critical temperature, the circuit-breaking elements would chatter and cause a swiftly repeated opening and closing of the circuit. In this present novel mechanism, the circuit is not interrupted until the thermo-bar has moved a predetermined distance from the contacts. Such lag in the breaking or opening of the circuit is provided by the use of the relatively stiff and flexible contact blades and by the supplemental connection for the thermo-bar and blades. Thus, as the thermo-bar in heating moves from the contact screws, the stiff blade is first disengaged from its post 17 as is suggested in Figure 5. When the thermo-bar has continued its opening movement for the predetermined distance or lag, the flexible blade 41 is moved from its contact screw 18 and the circuit is opened. The relatively stiff metallic backing plate 44 being movable with the blade 14 assures the opening travel of the flexible blade 41 in timed relation to that of the stiff blade 14.

I claim as my invention:

1. A thermostatic circuit-controlling device comprising a base, two contacts mounted thereon, a thermostatic element, two spaced arms carried thereby, contacts on said arms, one of said arms being relatively flexible, a relatively stiff backing plate movable therewith, the other of said arms being relatively stiff, said flexible arm being apertured to permit a base contact to project therethrough without touching.

2. A thermostatic circuit-controlling device comprising a base, two contacts mounted thereon, a thermostatic element carried by said base, two spaced arms carried by said element and provided with contacts, one of said arms being relatively stiff and the other being relatively flexible, one of said arms being apertured to permit passage of one of the base contacts therethrough without contact.

3. A thermostatic circuit controlling device comprising a pair of contacts, a relatively stiff circuit making element arranged to automatically move to engage one of the contacts, a relatively stiff backing element secured to this circuit-making element on that side adjacent the pair of contacts, and in divergent relation, and a relatively flexible contact element secured between the first mentioned elements and normally engaged against the backing element, the arrangement being such that the flexible element engages its contact before the stiff one, the arrangement further being such that the backing and flexible element never make contact with that one of the pair engaged by the first mentioned stiff element, and both backing and flexible elements being disposed between that member and the pair of contacts.

4. A thermostatic circuit controlling device comprising a pair of relatively stiff elements and a flexible element therebetween, with the flexible element normally flexed against one of the stiff elements, said stiff elements being spaced to allow swinging of the flexible element therebetween, a pair of contacts with which one of the stiff elements is only engageable, and with the other of which the flexible element is only engageable, the arrangement being such that the flexible element is first to engage its contact and last to disengage.

5. A device for the purpose described comprising a pair of contacts, and a contact element movable with respect thereto, and including two arms, one arm lying between the contacts and the other arm, and each arm being engageable only with one contact, the arrangement being such that that arm which is intermediately disposed engages its contact first, and the arrangement further being such that the same arm is disengaged from its contact, after release of the other arm.

6. In a thermostatic circuit-controlling mechanism, the combination of a pair of adjacently spaced contacts, a thermo-bar, electrical connections for the contacts, a pair of adjacent members carried by the bar and operable upon movement of the thermo-bar to engage and be disengaged from the contacts to make and break a circuit thereacross, one of the members being apertured to permit one of the contacts to be freely passed therethrough for engagement by the other member upon circuit-closing movement of the thermo-bar.

7. In a thermostatic circuit-controlling means, the combination of a thermostatic element, a pair of members carried by the element in therminally spaced relation, a pair of insulated contacts adapted to have a circuit closed thereacross by the members, one of the members being relatively stiff and the other relatively flexible whereby, upon closing movement of said element, the flexible member may engage its contact and flex to permit the other member to engage the other contact and, upon opening movement, the stiff member may first be disengaged and thereafter the flexible member, and means to assure disengagement of the flexible member from its contact after a predetermined open-travel of the relatively stiff member from its contact.

8. In a thermostatic circuit-controlling mechanism, the combination of a thermostatic element, a pair of members carried by the element in terminally spaced relation, a pair of insulated contacts adapted to have a circuit closed thereacross by the members, one of the members being relatively stiff and the other relatively flexible whereby, upon closing movement of said element, the flexible member may engage its contact and flex to permit the other member to engage the other contact and, upon opening movement, the stiff member may first be disengaged and thereafter the flexible member, and a relatively stiff backing for a portion of said flexible member, said backing being adapted to move with said stiff member in spaced relation thereto whereby to assure disengagement of the flexible member from its contact after a predetermined opening travel of the relatively stiff member from its contact.

9. In a thermostatic circuit-controlling mechanism, the combination of a thermostatic element, a pair of members carried by the element in a therminally spaced relation, a pair of insulated contacts adapted to have a circuit closed thereacross by the members, one of the members being relatively stiff and the other relatively flexible whereby, upon closing movement of said element, the flexible member may engage its contact and flex to permit the other member to engage the other contact and, upon opening movement, the stiff member may first be disengaged and thereafter the flexible member, and means connected to and movable with said stiff member to assure disengagement of said flexible member after a predetermined opening travel of the relatively stiff member from its contact.

10. A device of the class described comprising an element having two conducting arms, one flexible, a pair of contacts, each arm being engageable with only one contact, the arrangement being such that the flexible arm is always first to engage and last to disengage, and said flexible arm being interposed between the contacts, and the other arm.

11. A device of the class described comprising an element having two conducting arms, one flexible, a pair of contacts, each arm being engageable with only one contact, and a backing element for the flexible arm limiting its movement in direction of the contacts.

12. A device of the class described comprising an element having two conducting arms, one flexible, a pair of contacts, each arm being engageable with only one contact, and a backing element for the flexible arm limiting its movement in direction of contacts, said flexible arm being normally held against said backing element.

13. A device of the class described comprising an element having two conducting arms one flexible, a pair of contacts, each arm being engageable with only one contact, a backing element for the flexible arm, said flexible element being capable of movement with respect to said backing element and other contact making arm, in direction toward and away from the contacts.

14. A device of the class described comprising an element having two conducting arms one flexible, a pair of contacts, each arm being engageable with only one contact, and a backing element for the flexible arm limiting its movement in direction of the contacts in a manner to cause the flexible element to suddenly leave its contact.

15. A device of the class described comprising an element having two conducting arms one flexible, a pair of contacts, each arm being engageable with only one contact, a backing element for the flexible arm limiting its movement in direction of the contacts, said backing element and flexible arm each having an opening permitting said elements to pass freely over one of the contacts, so that the other arm can engage that contact.

16. A device of the class described comprising a thermal element having attached thereto in spaced relation two conducting arms one more flexible than the other, a pair of contacts, each arm being engageable with only one contact, and the arms being arranged to sequentially engage the contacts.

17. A device of the class described comprising a thermal element having attached thereto in spaced relation two conducting arms one thicker than the other, a pair of contacts, each arm being engageable with only one contact, and the arms being arranged to sequentially engage the contacts.

18. A device of the class described comprising a thermal element, a pair of arms attached to said thermal element in spaced relation and with their flat faces opposed, a pair of contacts placed laterally at one side of both elements, and each arm being engageable with only one contact.

19. A device of the class described comprising a thermal element, a pair of arms attached to said thermal element in spaced relation and with their flat faces opposed, a pair of contacts placed laterally at one side of both elements, and each arm being engageable with only one contact, and said arms being sequentially engageable.

In witness whereof, I have hereunto set my hand this 11th day of May, 1927.

FREDERICK S. DENISON.